(12) United States Patent
Filhaber et al.

(10) Patent No.: US 6,836,602 B2
(45) Date of Patent: Dec. 28, 2004

(54) DIRECT BONDING OF OPTICAL COMPONENTS

(75) Inventors: John F. Filhaber, Corning, NY (US); Clarence E. Ford, deceased, late of Painted Post, NY (US); by Teresa Ford, legal representative, Painted Post, NY (US); Robert Sabia, Corning, NY (US); Jackson P. Trentelman, Lawrenceville, PA (US)

(73) Assignee: Corning Incorporated, Corning, NY (US)

( * ) Notice: Subject to any disclaimer, the term of this patent is extended or adjusted under 35 U.S.C. 154(b) by 329 days.

(21) Appl. No.: 10/035,358

(22) Filed: Oct. 26, 2001

(65) Prior Publication Data

US 2003/0081930 A1 May 1, 2003

(51) Int. Cl.[7] .............................. G02B 6/26; G02B 6/38; G02B 6/40
(52) U.S. Cl. ............................. 385/51; 385/78; 385/85; 385/88; 385/147; 385/60
(58) Field of Search ............................... 385/50–52, 78, 385/81, 83–85, 88, 89, 147, 60

(56) References Cited

U.S. PATENT DOCUMENTS

| 4,186,999 A | 2/1980 | Harwood et al. ........ 350/96.21 |
| 4,407,667 A | 10/1983 | Le Noane et al. ........... 65/3.11 |
| 4,530,452 A | 7/1985 | Balyasny et al. ............. 225/96 |
| 4,626,068 A | 12/1986 | Caldwell ................. 350/96.34 |
| 4,960,331 A | 10/1990 | Goldman et al. ........... 356/350 |
| 5,183,710 A | 2/1993 | Gerbino ..................... 428/405 |
| 5,319,483 A | 6/1994 | Krasinski et al. ........... 359/113 |
| 5,346,583 A | * 9/1994 | Basavanhally ............... 216/26 |
| 5,441,803 A | 8/1995 | Meissner ..................... 428/220 |
| 5,451,547 A | 9/1995 | Himi et al. ................. 437/225 |
| 5,452,122 A | 9/1995 | Tsuneda et al. ............. 359/281 |
| 5,579,421 A | * 11/1996 | Duvall et al. ................. 385/14 |
| 5,631,986 A | * 5/1997 | Frey et al. .................... 385/78 |
| 5,689,519 A | 11/1997 | Fermann et al. .............. 372/18 |
| 5,785,874 A | 7/1998 | Eda ............................. 216/24 |

(List continued on next page.)

FOREIGN PATENT DOCUMENTS

| DE | 2130905 | 1/1973 | |
| DE | 19731075 | 1/1999 | |
| EP | 1057793 | 3/2002 | |
| JP | 52-78450 | 7/1977 | ............ G02B/5/14 |
| JP | P2000-56265 A | 2/2000 | ........... G02B/27/28 |
| WO | WO00/17698 | 3/2000 | |
| WO | WO01/73831 | 10/2001 | |
| WO | WO01/98225 | 12/2001 | |

OTHER PUBLICATIONS

A. Sayah, D. Solignac, T. Cueni, "Development of novel low temperature bonding technologies for microchip chemical analysis applications," Sensors and Actuators, 84 (2000) pp. 103–108.

(List continued on next page.)

Primary Examiner—Akm Enayet Ullah
Assistant Examiner—Michelle R. Connelly-Cushwa
(74) Attorney, Agent, or Firm—Siwen Chen

(57) ABSTRACT

Methods of bonding optical components are disclosed. Bonding is achieved without use of adhesives or high temperature fusion. The invention is useful for bonding optical fibers together and for bonding optical fiber arrays to lens arrays.

23 Claims, 4 Drawing Sheets

U.S. PATENT DOCUMENTS

| | | | | |
|---|---|---|---|---|
| 5,846,638 A | * | 12/1998 | Meissner | 428/220 |
| 5,852,622 A | | 12/1998 | Meissner et al. | 372/39 |
| 5,915,193 A | | 6/1999 | Tong et al. | 438/455 |
| 5,932,048 A | | 8/1999 | Furukawa et al. | 156/153 |
| 5,989,372 A | | 11/1999 | Momoda et al. | 156/89.11 |
| 6,030,883 A | | 2/2000 | Nishimoto et al. | 438/455 |
| 6,048,103 A | | 4/2000 | Furukata et al. | 385/73 |
| 6,098,429 A | | 8/2000 | Mazabraud et al. | 65/392 |
| 6,120,917 A | | 9/2000 | Eda | 428/692 |
| 6,129,854 A | | 10/2000 | Ramsey et al. | 216/18 |
| 6,153,495 A | | 11/2000 | Kub et al. | 438/459 |
| 6,178,779 B1 | | 1/2001 | Drouart et al. | 65/391 |
| 6,249,619 B1 | | 6/2001 | Bergmann | 385/11 |
| 6,275,336 B1 | | 8/2001 | Yoshikawa et al. | 359/484 |
| 6,359,733 B1 | | 3/2002 | Iwatsuka et al. | 359/500 |
| 6,429,144 B1 | | 8/2002 | Vines et al. | 438/745 |
| 6,548,176 B1 | | 4/2003 | Gwo | 428/420 |
| 6,621,630 B2 | | 9/2003 | Iwatsuka | 359/484 |
| 2002/0108556 A1 | * | 8/2002 | Ebbers | 117/2 |
| 2003/0079503 A1 | | 5/2003 | Cook et al. | 65/407 |
| 2003/0079823 A1 | | 5/2003 | Sabia | 156/99 |
| 2003/0081930 A1 | | 5/2003 | Filhaber et al. | 385/147 |

OTHER PUBLICATIONS

P. Rangsten, O. Vallin, K. Hermansson, Y. Backlund, "Quartz–to–Quartz Direct bonding," J. Electrochemical Society, V. 146, N. 3, pp. 1104–1105, 1999).

H. Nakanishi, T. Nishimoto, M. Kani, T. Saitoh, R. Nakamura, T. Yoshida, S. Shoji, "Condition Optimization, Reliability Evaluation of $SiO_2$–$SiO_2$ HF Bonding and Its Application for UV Detection Micro Flow Cell," Sensors and Actuators, V. 83, pp. 136–141, 2000.

A. Yamada, et al., Bonding Silicon wafer to Silicon Nitride With Spin–on Glass Adhesive, Electronics Letters, Mar. 26, 1987, vol. 23, No. 7.

D.J. Harrison, et al., Micromachining a Miniaturized Capillary Electrophoresis–Based Chemical Analysis System on a Chip, Science 261 (1993) 895–897.

W.P. Maszara, Silicon–on–insulator by Wafer Bonding: A Review, J. Electrochemical Society 138 (1991) 341–347.

D–W. Shin, et al., The Stacking Faults and Their Strain Effect at the $Si/SiO_2$ Interfaces of a Directly Bonded SOI (silicon on insulator), Thin Solid Films, V. 346, pp. 169–173, 1999.

Q–Y. Tong, et al., The Role of Surface Chemistry in Bonding of Standary Silicon Wafers, J. Electrochemical Society V. 144, N. 1, pp. 384–389, 1997.

Andreas Plobl et al., Wafer Direct Bondiong: Tailoring Adhesion Between Brittle Materials, Materials Science and Engineering, R25 (1999) pp. 1–88.

Arthur Landrock. "Adhesives Technology Handbook." 1985, p. 117–118.

Yoshikawa Hiroki; Japanese abstract of 2002321947; Nov. 8, 2002 "Optical Device and Method for Producing the Same".

Furukata; Japanese Abstract of Publication No. 08146351; Jun. 7, 1996; "Element for Optical Isolator and its Production".

Ohashi et al; Japanese Abstract of Publication No. 03–115178; May 16, 1991; "Method for Joining Aluminum or Aluminum Ceramics by Diffusion".

Onishi et al; "A Novel Temperature Compensation Method for SAW Devices Using Direct Bonding Techniques"; IEEE Ultrasonics Symposium; 1997; pp. 227–230.

* cited by examiner

DIRECT BONDING OF OPTICAL COMPONENTS

FIELD OF THE INVENTION

This invention relates to direct bonding of optical components. More particularly, the invention relates to methods for direct bonding of optical components using a low temperature process without the use of adhesives to form a bond between the components.

BACKGROUND OF THE INVENTION

Bonding of optical waveguide fibers to photonic or optical components such as a second optical waveguide fiber, a lens or lens arrays typically utilizes fusion bonding, adhesive bonding or mechanical mounting with an air gap to provide a bond between the optical fiber and the component. For example, optical fibers are typically spliced together using fusion bonding, wherein the fiber ends are abutted to one another and heated to their softening point to obtain a bond between the fibers. Fusion splicing may work well for two fibers having the same glass composition, however, such bonding is problematic for two or more fibers having differing compositions. As one example, fusion bonding of an antimony silicate fiber (e.g., XBLAN) with a silica-based fiber is not possible because the difference in the softening temperature of these two types of glasses is too great to allow bonding without deformation of the fiber having the lower softening point or impairment of its optical properties. Furthermore, low yields due to splice breaks result when two fibers having significantly different CTE's are bonded together at a high temperature and then cooled to room temperature.

Wringing is another type of bonding process available for bonding and refers to a process of bonding glass surfaces in which adsorbed surface groups are removed from active bonds on a surface by heating the parts to temperatures typically above 600° C. but below the softening point of the glass. Adsorbed water and organics will vaporize and the result is that the surface sites become "active." At such a temperature or after cooling in a clean, low humidity environment, surfaces can be placed in contact at which point covalent bonds spontaneously form between "active" bonds on each surface. This is similar to vacuum bonding, except the surface is activated by temperature rather than by a strong vacuum. However, neither of these processes is suitable in systems that include polymeric components, such as optical fiber coatings, because high temperatures and high vacuum pressures are detrimental to polymers.

In the manufacture of fiber-lens arrays, typically an array of optical fibers, which may comprise any number of fibers arranged in a one or two dimensional array, the fiber ends are typically bonded to the lens array by either adhesive bonding or mechanical mounting at a predetermined distance from the lens array with an air gap. The use of adhesive bonding, however, does not provide a clear optical path between the endface of the fibers and the individual lens elements in the lens array. A disadvantage of mechanical mounting is that an air gap is present between the bonded surfaces. Since this air gap has a different refractive index from the fiber and the lens, an antireflective coating must be applied to both surfaces to minimize losses. In cases in which the refractive index of the fiber and the lens is the same, an index matching material, such as an oil, can be placed in the gap between the fiber and the lens. Index matching materials and adhesives, however, are not reliable, particularly when the bonded parts encounter thermal cycling.

It would be desirable to provide a bonding process for optical fiber waveguides and optical components that results in an optically clear bond. In addition, it would be advantageous to bond optical fibers and components together without the use of adhesives or temperatures near the softening temperature of the optical fibers. In systems that include polymeric components, such as coatings on optical fibers, it would be desirable to provide a process that does not require temperatures that are detrimental to the polymers present in the bonded system.

SUMMARY OF INVENTION

One embodiment of the invention relates to a method of manufacturing an optical component. This embodiment includes the steps of providing an optical waveguide with a bonding surface, , and providing an article having a surface for bonding to the bonding surface of the optical waveguide. The article may contain silicon or glass. In another embodiment, the optical waveguide is an optical waveguide fiber and the bonding surface includes an endface of the fiber. In this embodiment, the bonding surface of the optical fiber waveguide and the surface of the article are bonded together without an adhesive and at a temperature below the softening temperature of the optical waveguide fiber, and preferably below a temperature that would degrade any polymeric coating associated with the fiber.

In one embodiment of the invention, the glass article includes a second optical waveguide fiber. In another aspect of this embodiment, the first and second optical waveguide fibers are disposed within ferrules. In still another aspect, the article may include a photonic component such as a planar waveguide, an amplifier, a filter, a prism, a polarizer, a birefringent crystal, a faraday rotator and a lens. In still another aspect, the article may include an infrared transparent material such as glass or silicon.

According to another embodiment of the invention, the bonding surface of the optical waveguide and the surface of the article may be contacted with a solution prior to bonding. In still another aspect, the solution has a pH greater than 8. Another embodiment of the invention involves providing termination groups on the bonding surface of the optical waveguide and the surface of the article. According to this aspect, the termination groups may include —OH, ≡Si—OH, =Si—(OH)$_2$, —Si—(OH)$_3$ and —O—Si—(OH)$_3$, and combinations thereof.

Still another embodiment of the invention may include the step of providing a hydrophilic surface on the bonding surface of the optical waveguide and the surface of the article. This embodiment may include forming hydrogen bonds between the bonding surface of the optical waveguide and the surface of the article. This may be accomplished by contacting the bonding surface of the optical waveguide and the surface of the article with an acid. It may also be desirable to contact the bonding surface of the optical waveguide and the surface of the article with a solution having a pH greater than 8. Such a solution may include a hydroxide such as sodium hydroxide, potassium hydroxide or ammonium hydroxide. Another embodiment of the invention may involve eliminating absorbed water molecules at the interface between the bonding surface of the optical waveguide and surface of the article, which may be accomplished by heating the interface.

According to another embodiment of the invention, a method of bonding a lens array to an optical waveguide array is provided. In this aspect, an array of optical waveguides, for example, waveguide fibers having bonding surfaces, is provided and aligned with a lens array having surfaces for bonding to the bonding surfaces of the optical waveguide fibers. The surfaces of the lens array are placed in contact with the bonding surfaces of the optical waveguide fibers in the absence of an adhesive and below the softening temperature of the optical waveguide fibers, preferably below a temperature that would degrade any polymeric coatings on the fiber, to bond the fibers and the lenses together. As in the previous embodiment, bonding may be achieved by contacting the bonding surface of the optical waveguide fibers and the surfaces of the lens array with a solution, preferably a solution having a pH greater than 8. Another embodiment may involve providing termination groups on the bonding surfaces of the optical waveguide fibers and the surfaces of lens array. The termination groups may include —OH, ≡Si—OH, =Si—(OH)$_2$, —Si—(OH)$_3$ and —O—Si—(OH)$_3$, and combinations thereof. Bonding of the lens array with the fiber array may further include forming hydrogen bonds between the bonding surfaces of the optical fibers and the surfaces of the lens array. This may be accomplished by contacting the bonding surface of the optical waveguide fibers and the surfaces of the lens array with an acid. The bonding method may further involve eliminating absorbed water molecules and adsorbed hydroxyl groups at the interface between the bonding surface of the optical fiber waveguide and surfaces of the lens array, which may be achieved by heating the interface. In another aspect, it may be desirable to dry the surfaces to remove absorbed water molecules and to draw a slight vacuum, for example, about $10^{-3}$ millibar, to assist in the prevention of an air gap between the surfaces. In still another embodiment, the optical fibers are disposed in a frame including a bonding surface and the lenses are disposed in a frame including a bonding surface, and the bonding surface of the lens frame and the bonding surface of the fiber frame are placed in contact to bond the frames together.

Still another embodiment of the invention relates to manufacturing an optical component including the steps of providing two optical articles each having a bonding surface and bonding the surface of the respective articles to each other without an adhesive and at a softening temperature below the optical article. The optical articles may include, but are not limited to a lens, a prism, a polarizer, a grating, a filter, a birefringent crystal, and a faraday rotator. One aspect of this embodiment involves contacting the optical articles with a solution, for example, a solution having a pH greater than 8, such as sodium hydroxide. As in the previously described embodiments, further aspects may include providing termination groups and/or providing a hydrophilic surfaces on the bonding surfaces of the optical articles.

The invention provides a simple, low temperature and reliable bonding method that provides an optically clear bond between optical fibers and optical components. Bonding can occur at temperatures lower than the softening or deformation temperature of the glass, and in some cases lower than 100° C. Additional advantages of the invention will be set forth in the following detailed description. It is to be understood that both the foregoing general description and the following detailed description are exemplary and are intended to provide further explanation of the invention as claimed.

DETAILED DESCRIPTION

Figure 1:
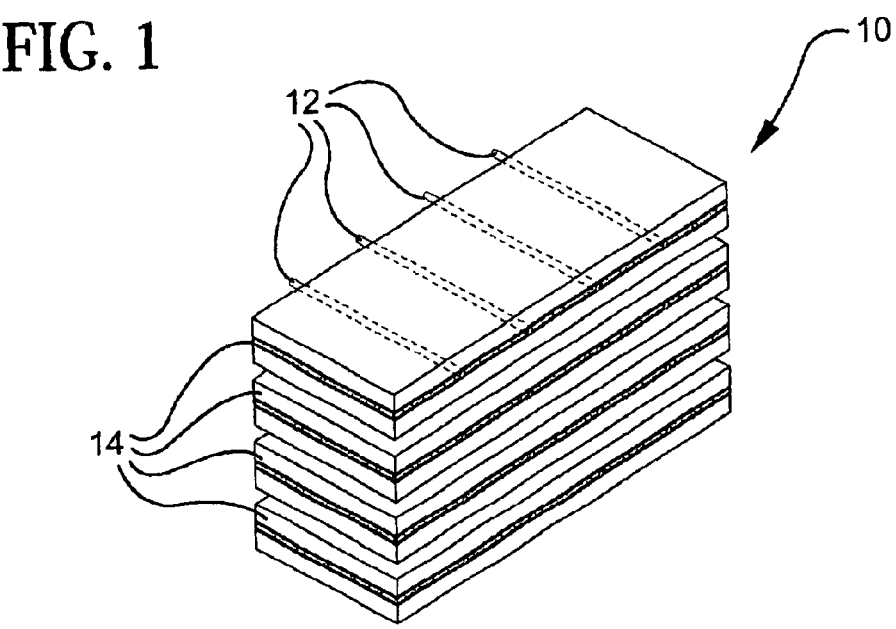
FIG. 1 is a schematic view of a stacked fiber array.

According to the present invention, various methods can be utilized to directly bond optical articles together. The optical articles, can include, but are not limited to, an optical waveguide, a planar waveguide, an optical waveguide fiber, a lens, a prism, a grating, a faraday rotator, a birerfringent crystal, a filter, a polarizer to an optical component. As used herein, the terms "direct bonding" and "direct bond" means that bonding between two surfaces is achieved at the atomic or molecular level, no additional material exists between the bonding surfaces such as adhesives, and the surfaces are bonded without the assistance of fusion of the surfaces by heating. As used herein, the terms "fusion" or "fusion bonding" refers to processes that involve heating the bonding surfaces and/or the material adjacent the bonding surfaces to the softening or deformation temperature of the articles bonded. The methods of the present invention do not involve the use of adhesives or fusion bonding to bond optical components. Instead, the present invention utilizes methods that involve forming a direct bond between the surfaces without high temperatures that soften the glass material to the point of deformation or the softening point and which typically results in an interface that is not optically clear. The present invention provides a bonding method that provides an impermeable, optically clear seal, meaning that there is essentially zero distortion of light passing between the interface of the bonded surfaces. The formation of a direct bond between two glass, crystalline or metal surfaces allows for an impermeable seal that has the same inherent physical properties as the bulk materials being bonded.

A preferred bonding process that may be utilized according to the present invention involves chemical bonding. In literature, low-temperature bonding technology has been reported for bonding soda-lime-silicate glass and for crystalline quartz (see, e.g., A. Sayah, D. Solignac, T. Cueni, "Development of novel low temperature bonding technologies for microchip chemical analysis applications," Sensors and Actuators, 84 (2000) pp. 103–108 and P. Rangsten, 0. Vallin, K. Hermansson, Y. Backlund, "Quartz-to-Quartz Direct bonding," J. Electrochemical Society, V. 146, N. 3, pp. 1104–1105, 1999). Both the Sayah and Rangsten references, disclose using acid cleaning techniques. Another article, H. Nakanishi, T. Nishimoto, M. Kani, T. Saitoh, R. Nakamura, T. Yoshida, S. Shoji, "Condition Optimization, Reliability Evaluation of SiO2-SiO2 HF Bonding and Its Application for UV Detection Micro Flow Cell," Sensors and Actuators, V. 83, pp. 136–141, 2000, discloses low-temperature bonding of fused $SiO_2$ by first contacting the bonding surfaces with hydrofluoric acid.

According to one embodiment of the invention, termination groups are provided on opposing surfaces of the articles to be bonded. No adhesives, high temperature treatment or caustic hydrofluoric acid treatments are required prior to bonding the opposing surfaces. In one embodiment of the invention, a surface treatment of a high pH base solution such as sodium hydroxide, potassium hydroxide or ammonium hydroxide is utilized to provide termination groups on the bonding surfaces of the articles. In a preferred aspect, the surfaces are first cleaned using a detergent followed by rinsing with an acid solution such as a nitric acid solution to remove particulate contamination and soluble heavy metals respectively.

According to one embodiment of the invention, the surfaces are contacted with a high pH solution, rinsed, pressed into contact and gradually heated to the desired temperature, preferably to a temperature less than 300° C. To enhance bonding, it is preferred that the surfaces are flat, as determined by performing a preliminary cleaning and pressing the dried samples into contact.

Preferably, the bonding process of the present invention consists of machining each surface to be sealed to an appropriate flatness. Particularly preferred flatness levels are less than about 1 micron and roughness levels of less than about 2.0 nm RMS. After polishing, each surface is preferably cleaned with an appropriate cleaning solution such as a detergent, soaked in a low pH acidic solution, and soaked in a high pH basic solution to generate a clean surface with silicic acid-like (i.e., $\equiv$Si—OH, $=$Si—$(OH)_2$, —Si—$(OH)_3$ and —O—Si—$(OH)_3$) terminated surface groups. In a preferred embodiment, the surfaces are assembled without drying. A low to moderate load (as low as 1 PSI) is then applied as the surfaces are heated to less than 300° C., for example, between 100–200° C., so that absorbed water molecules evaporates and silicic acid-like surface groups condense to form a covalently-bonded interface. Pressure can be applied using various fixturing devices that may include the use of compressed gas or a low vacuum pressure that is not detrimental to polymers. In some embodiments, it may be acceptable to moderately dry the bonding surfaces to remove absorbed water molecules, especially when using a low vacuum (e.g., about $10^{-3}$ millibar) to assist in sealing the bonding surfaces without an air gap.

According to one embodiment of the invention, it is desirable to provide bonding surfaces that are flat. It is preferred to have surfaces finished to 5 microns flatness or better, and preferably 1 micron flatness or better, on the surfaces to be bonded.

For glass surfaces having a high percentage of silica, higher temperature heating is not necessarily required to form high strength bonds. For higher silica systems, heating below 300° C. is usually sufficient to form a high strength bond. On the other hand, samples that have a lower amount of silica in the glass composition may require heating to higher temperatures to form a satisfactory bond. For example, Pyrex® glass (containing approximately 81% silica) and Polarcor™ (containing approximately 56% silica), which are borosilicate glasses, may require additional heating to provide sufficient bond strength for applications requiring high bond strength. The degree of heating for different bonding surfaces and glass surfaces will depend in part on the type of surface to be bonded (e.g., a fiber or a flat surface) and the desired bond strength for a particular application. In systems that include polymeric materials, such as optical fiber waveguides, it is undesirable to heat the surfaces to the point where the polymeric material is damaged.

Details on the bond strength and additional information on a preferred embodiment of chemically bonding glass surfaces may be found in copending United States patent application entitled, "Direct Bonding of Articles Containing Silicon," commonly assigned to the assignee of the present patent application and naming Robert Sabia as inventor. However, the present invention is not limited to the chemical bonding methods disclosed in the copending patent application; i.e., other chemical bonding techniques can be utilized in accordance with the present invention.

In one particular embodiment of the invention, optical fiber arrays can be bonded to microlens arrays. Various methods exist in the prior art for forming fiber arrays and microlens arrays, and the following information on fiber arrays and microlens arrays is not intended to be limiting of the present invention. It is to be understood that one embodiment of the present invention relates to the bonding of microlens arrays and fiber arrays after the individual array elements have been manufactured.

Optical fiber arrays are presently produced commercially by silicon v-groove technology, wherein grooves are etched in opposing surfaces of two silicon wafers, and two wafers are assembled such that the grooves are aligned and a plurality of fibers can be placed inside the plurality of opposing grooves. Examples of such configurations are described in U.S. Pat. Nos. 5,446,815 and 5,241,612. In this manner, a line of fibers can be mounted with accurate pointing angles and pitch positions. The wafers with mounted fibers can be cut, or the wafers can be cut prior to subsequent mounting that includes extending fiber lengths from the surfaces. The faces of the fibers and the holder are ground, lapped and polished to produce a flat surface with optically clear fiber ends.

A second method for making fiber arrays is to take a block of material and produce holes through the surface such that fibers may be extended through and mounted into position. The entire plate is then processed to be flat and polished. Mounting of fibers in arrays to such the blocks of material can include the bonding techniques of the present invention, the use of polymeric adhesives, or the use of a low-temperature frit. Mechanical fixturing is also possible, although the formerly mentioned methods are preferred, with the use of polymeric adhesives being standard at this time.

Two general methods exist for manufacturing silicon-based lens arrays, etch processing and thermal processing. Etch processing involves using either a wet or gaseous etch (e.g., reactive ion etching or plasma) to remove material from a surface in a preferential pattern to produce lenses. As such, the lens and array materials are identical. Such materials include but are not limited to silicon (Si), fused or synthetic silica ($SiO_2$), and silicate-based glasses such as Fotoform manufactured by the assignee of the present invention. Thermally processed lens arrays involve the treatment of a glass above the glass softening point such that a lens is formed. This can include micro-molding of lenses, and lens arrays produced from photosensitive glasses with appropriate ceramming treatments. Alternative processes exist that incorporate both etching and thermal techniques to produce lens arrays. Additional details on the formation of lens arrays and fiber arrays may be found in N. F. Borrelli, "Microoptics Technology, Fabrication and Application of Lens Arrays and Devices," Marcel Dekker, Inc., ISBN: 0-8247-1348-6, (1999).

For lens arrays that are produced to have a planar-convex structure (back side is flat), fiber and lens arrays can be sealed directly to each other assuming the lens plate is the appropriate thickness to allow for focusing of the signal from each fiber into each lens (or vice-versa). Here, the sealing process can be readily employed to generate an impermeable seal without an air gap. A directly bonded seal between the lens array and the fiber array is optically transparent (does not distort transmitted light). If the refractive indexes for the fiber core and lens material are significantly different, an antireflective (AR) coating will need to be applied to one surface such that the thickness of individual layers that comprise the coating allow for the RI difference between the two materials rather than for one material and air. For this specific case, sealing will be implemented between the top AR coating surface and the non-coated array (fiber or lens).

Figure 2:
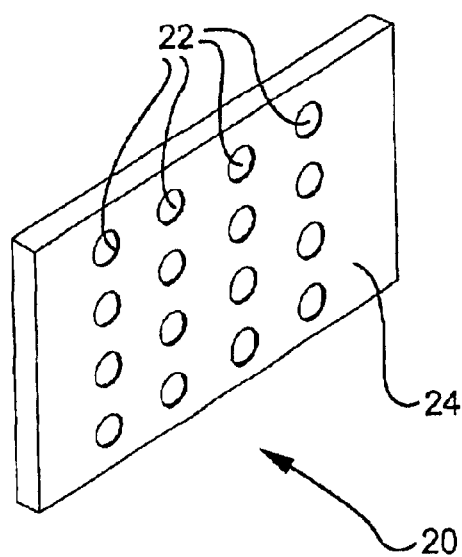
FIG. 2 is a schematic view of a microlens array.

Referring to FIG. 1, a fiber array 10 may be produced in accordance with the methods discussed above. Thus, a plurality of fibers 12 can be disposed between frames or plates 14 containing v-grooves (not shown). The array shown in FIG. 1 is a 4×4 array, but it is understood that an array containing any number of fibers can be utilized according to the present invention. Referring to FIG. 2, a microlens array 20 is shown comprising a plurality of individual lenses 22 disposed in a plate or frame 24. A microlens array can be produced according to a wide variety of methods, including the methods discussed above.

Figure 3:
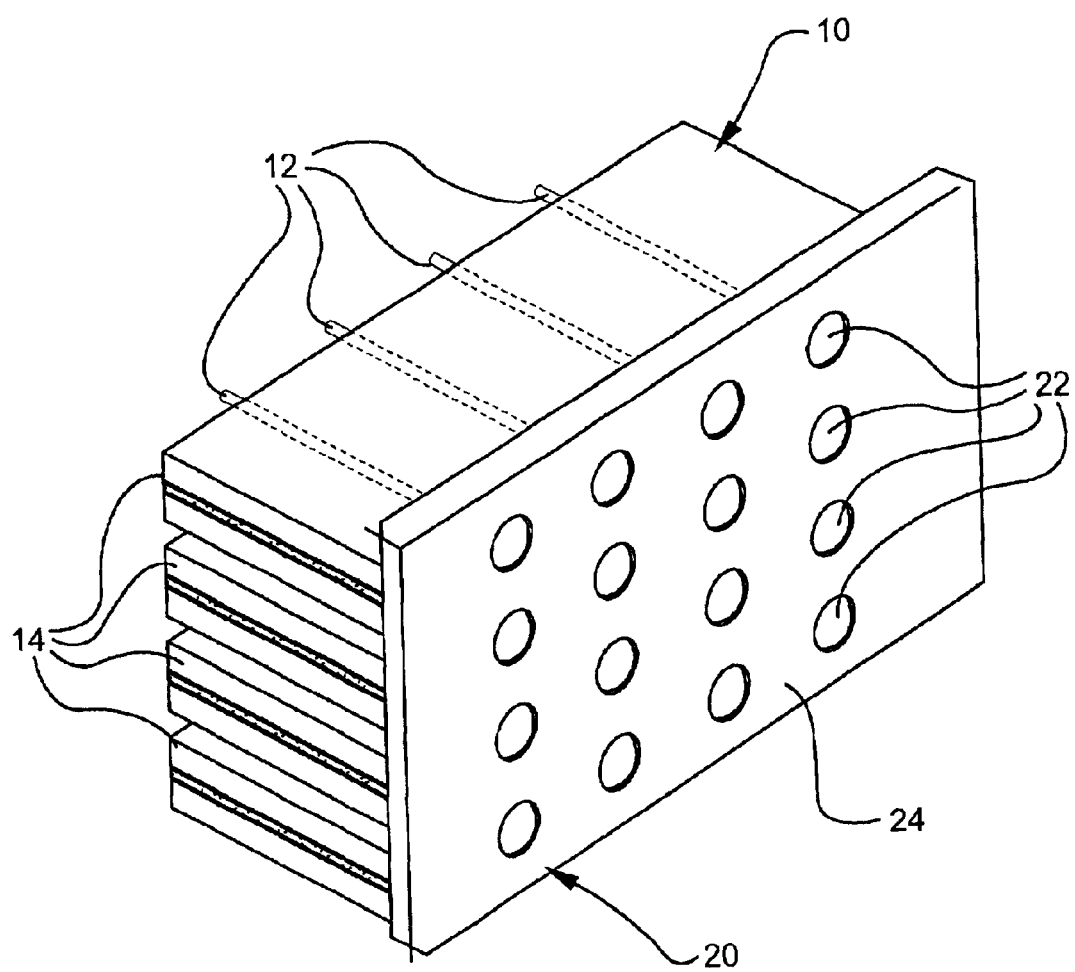
FIG. 3 is a schematic view of a stacked fiber array bonded to a microlens array according to one embodiment of the present invention.

According to the present invention, the endfaces of the optical fibers and the surfaces of the microlenses to be bonded to the fiber array are polished to an appropriate flatness. The endfaces and the lenses are then joined together without using an adhesive or raising the temperature of bonded component to the deformation temperature of the lens material or the optical fiber material or the degradation temperature of any polymers present such as adhesives in other parts of the component or optical fiber coatings. According to a preferred aspect, the endfaces of the fibers and the lens surfaces to be bonded to the fiber endfaces are contacted with a solution that provides termination groups on the endfaces and the bonding surfaces of the lenses. These surfaces may be contacted with an acid solution and/or a high pH solution. Treatment with an acid will provide hydroxyl termination groups on the surfaces. Subsequent treatment with a solution having a pH greater than 8 will provide silicic acid-like termination groups on the surfaces. After treatment of the surfaces with a solution, the endfaces fiber array 10 and the microlens array 20 are joined together shown in FIG. 3 to provide a microlens-fiber array component. Thereafter, it may be desirable to heat the joined component to a temperature below the softening point or deformation temperature of the fibers or the microlens, and more preferably, below the degradation temperature of any polymeric components present, such as polymers used to hold fibers in the fiber array frame or plate. For sealing the fiber arrays and microlens arrays, sealing may occur between each fiber and each lens, as well as between the fiber array material (silicon, $SiO_2$, Fotoform, etc.) and the microlens material (silicon, $SiO_2$, Fotoform, etc.). Bonding of the fiber and lens array may also involve bonding of the frame or plate 14 holding the fibers to the frame or plate 24 holding the lenses. This method would involve directly bonding opposing surfaces of the frames or plates 14 and 24 using the bonding methods of the present invention.

Figure 4:
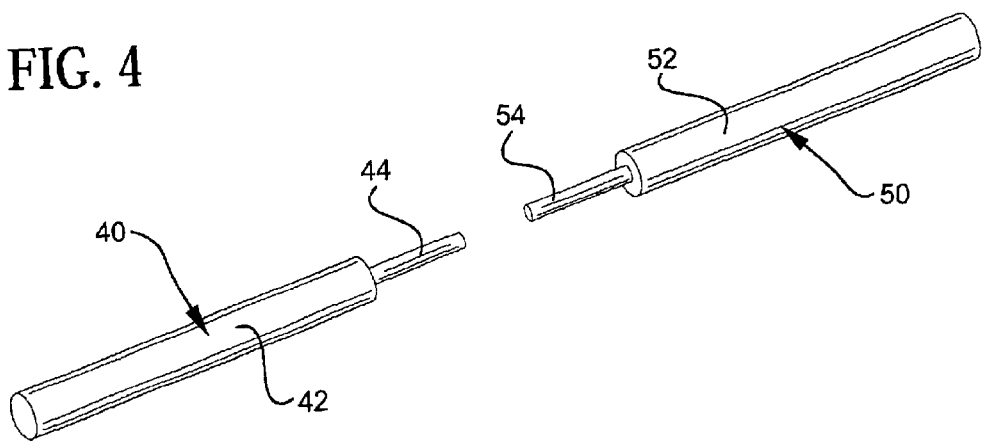
FIG. 4 is a schematic view of two optical fibers prior to bonding.
Figure 5:
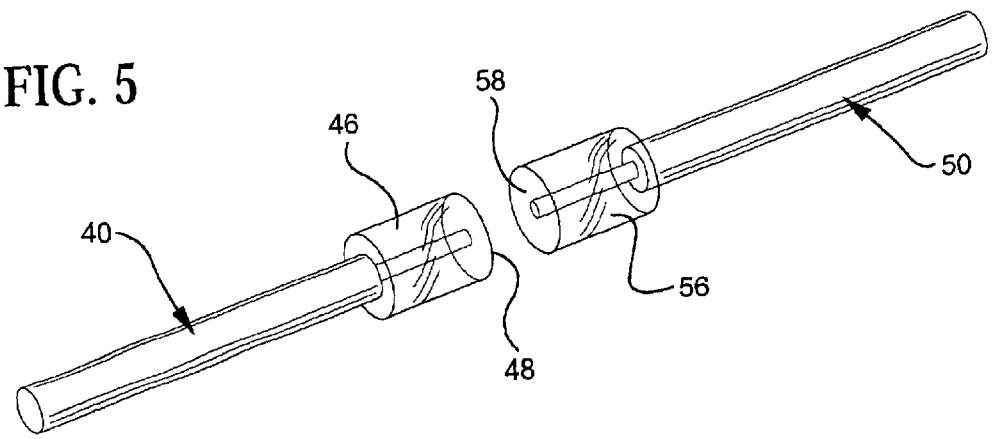
FIG. 5 is a schematic view of two optical fibers inserted in a pair of ferrules prior to bonding.

In another embodiment of the invention, direct bonding can be utilized to bond two optical fibers together. Such direct bonding, which does not involve heating the fibers to the softening point of the fibers to be bonded, is preferred to prevent deterioration of the optical properties caused by excessive heating and avoid poor bonding of different fibers having different CTEs. For example, as shown in FIG. 4, a first fiber 40 including a coating 42 and a stripped end 44 may be aligned with a second fiber 50 including a coating 52 and a stripped end 54. Referring to FIG. 5, preferably, a pair of ferrules 46, 56 is provided, and the fiber ends 44 and 54 may be inserted into the ferrules to assist in alignment of the fibers 40 and 50. After the fibers are inserted into the ferrules, they are mounted, ground and polished to provide flat surfaces on the fibers and the ferrules.

Figure 6:
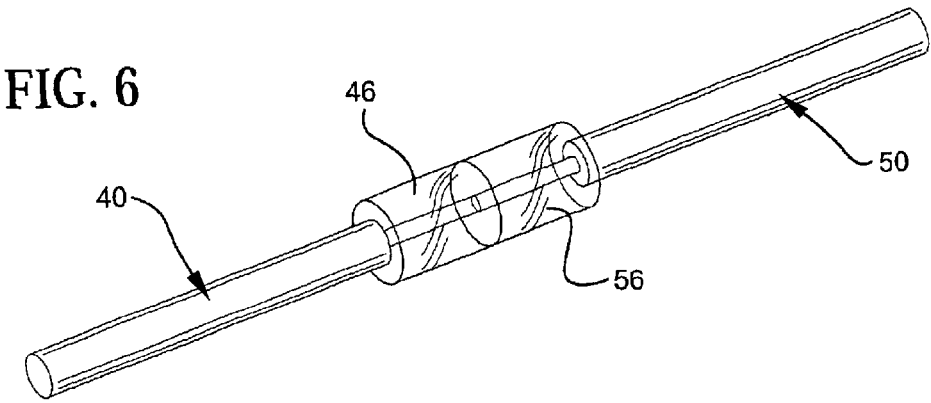
FIG. 6 is a schematic view of two optical fibers inserted in a pair of ferrules and bonded together according to one embodiment of the present invention.

The ferrules 46 and 56 containing the fibers 40 and 50 are then aligned as shown in FIG. 6 and directly bonded together according to methods of the present invention. In a preferred aspect, opposing faces 48, 58 of the ferrules 46, 56 are polished flat and contacted with a solution prior to contacting the opposing faces 48, 58. In a highly preferred aspect, termination groups such as hydroxyl groups or silicic acid-like groups are provided on the opposing surfaces prior to contacting the surfaces. This may be accomplished by contacting the opposing faces 48, 58 with an acid such as nitric acid. The opposing faces 48, 58 may also be contacted with a high pH solution (a solution having a pH between 8 and 14) such as sodium hydroxide, potassium hydroxide or ammonium hydroxide) prior to contacting the opposing faces 48, 58. Preferably, the surfaces are held together under moderate pressure of greater than one pound per square inch and heated to drive off absorbed water molecules and adsorbed hydroxyl groups and form a covalent bond between the fibers 40 and 50 and the ferrules 46 and 56. Additional details on such bonding may be found in copending United States patent application entitled, "Direct Bonding of Articles Containing Silicon," commonly assigned to the assignee of the present patent application and naming Robert Sabia as inventor.

Figure 7:
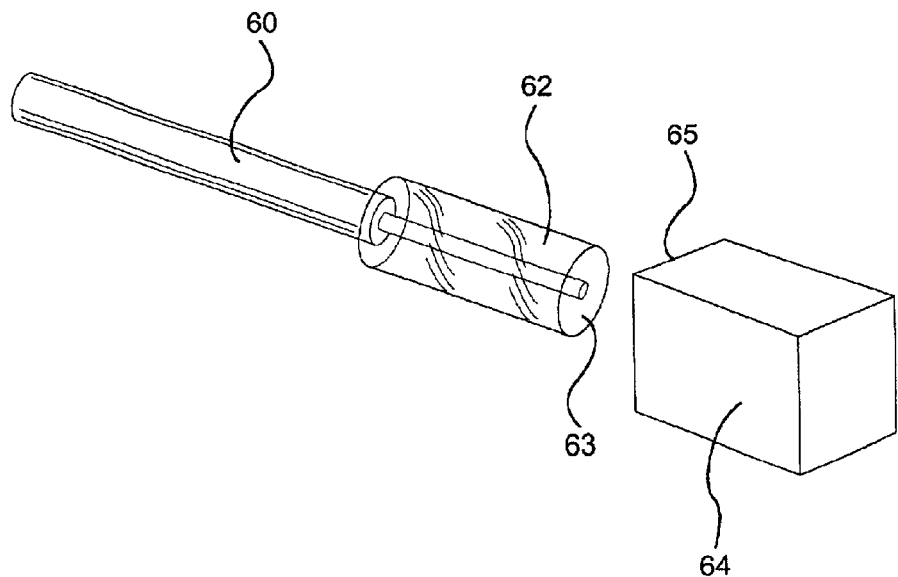
FIG. 7 is a schematic view of a fiber mounted in a ferrule prior to bonding to an optical component.
Figure 8:
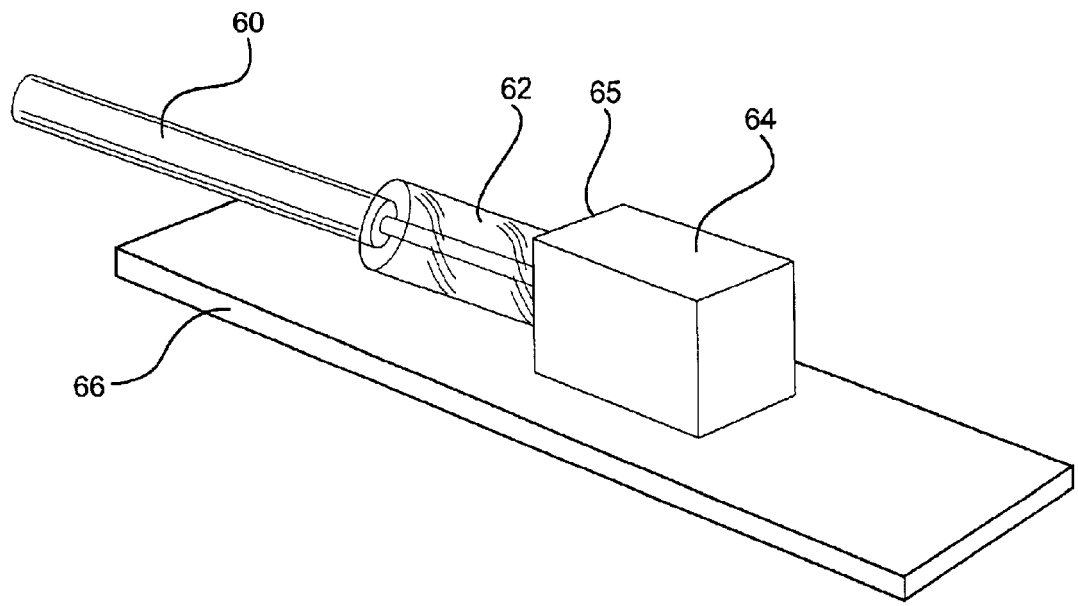
FIG. 8 is a schematic view of an optical fiber mounted in a ferrule and bonded to an optical component according to one embodiment of the present invention.

According to still another embodiment of the invention, an optical fiber and a wide variety of optical or photonic components can be bonded according to the direct bonding methods of the present invention. For example, as shown in FIG. 7, an optical fiber 60 mounted in a ferrule 62 can be bonded to an optical component 64 such as a planar waveguide, a lens, a prism, a grating, etc. using direct bonding techniques of the present invention. The fiber 60, the ferrule 62 and the component 64 can be mounted on and directly bonded on a support plate 66 as shown in FIG. 8. In a preferred aspect, according to the present invention, surface 63 of the ferrule 62 and surface 65 of the component 64 can be polished flat and contacted with a solution to provide termination groups on the surfaces 63 and 65. For example, contacting the surfaces 63 and 65 with an acid such as nitric acid will provide hydroxyl termination groups on the surface 63 and 65. Further treatment with a solution having a pH between 8 and 14, such as a solution containing ammonium hydroxide, potassium hydroxide and sodium hydroxide will provide silicic acid-like termination groups on the surfaces 63 and 65. When the surfaces 63 and 65 are placed in contact, placed under moderate pressure and heated to drive off the absorbed water molecules and adsorbed hydroxyl groups, a covalent bond will form between with the component 64. Additional details on such bonding may be found in copending United States patent application entitled, "Direct Bonding of Articles Containing Silicon," commonly assigned to the assignee of the present patent application and naming Robert Sabia as inventor. Thereafter, as shown in FIG. 8, the bonded fiber 60, ferrule 62 and component 64 can be mounted to the support plate 66 using conventional methods such as through mechanical attachment or adhesive bonding, or the bonded fiber 60, ferrule 62 and component 64 can be directly bonded to the support plate 66 using the methods of the present invention.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A method of manufacturing an optical component comprising the following steps:

providing an optical waveguide with a bonding surface;

providing an optical article having a surface for bonding to the bonding surface of the optical waveguide;

contacting the bonding surface of the waveguide and the surface of the article for bonding with an acid;

contacting the bonding surface of the waveguide and the surface of the article for bonding with a solution having a pH greater than 8, whereby termination groups selected from the group consisting of —OH, ≡Si—OH, =Si—(OH)$_2$, —Si(OH)$_3$ and —O—Si—(OH)$_3$, and combinations thereof, are formed on the surfaces; and bonding the surface of the optical waveguide and the surface of the article without an adhesive and at a temperature below the softening temperature of the optical waveguide.

2. The method of claim 1, wherein the optical article includes a second optical waveguide.

3. The method of claim 2 wherein the first and second optical waveguides comprise optical fibers.

4. The method of claim 3, wherein the first and second optical waveguide fibers are disposed within ferrules and the ferrules are bonded together.

5. The method of claim 1, wherein the optical article includes a photonic component selected from the group consisting of a waveguide, a planar waveguide, a grating, a filter and a lens.

6. An optical component made by the method of claim 5.

7. The method of claim 1, wherein the article includes an infrared transparent material.

8. The method of claim 1, wherein the solution having a pH greater than 8 includes a hydroxide.

9. The method of claim 1, wherein the solution having a pH greater than 8 includes ammonium hydroxide.

10. The method of claim 1, further including the step of eliminating adsorbed water molecules at the interface between the bonding surface of the optical fiber waveguide and surface of the article.

11. The method of claim 1, wherein a polymer is present in the optical waveguide or the optical article, and the bonding step is performed at a temperature below the temperature at which the polymer degrades and applying pressure on the bonding surfaces.

12. A method of bonding a lens array to an optical waveguide array comprising:

providing an array of optical waveguides, the waveguides having bonding surfaces;

providing a lens array having surfaces for bonding to the bonding surfaces of the optical waveguides;

contacting the bonding surfaces of the waveguide and the surfaces of the lens array for bonding with an acid;

contacting the bonding surfaces of the waveguides and the surfaces of the lens array for bonding with a solution having a pH greater than 8, whereby termination groups selected from the group consisting of —OH, ≡Si—OH, =Si—(OH)$_2$, —Si(OH)$_3$ and —O—Si—(OH)$_3$, and combinations thereof, are formed on the surfaces; and placing the surfaces of the lens array in contact with the bonding surfaces of the optical waveguides in the absence of an adhesive and below the softening temperature of the optical waveguides.

13. The method of claim 12 wherein the optical waveguides comprise optical fibers.

14. The method of claim 12, further including the step of eliminating adsorbed water molecules at the interface between the bonding surface of the optical fiber waveguide and surfaces of the lens array.

15. The method of claim 12, wherein the optical fibers are disposed in a frame including a bonding surface and the lenses are disposed in a frame including a bonding surface, and the bonding surface of the lens frame and the bonding surface of the fiber frame are placed in contact to bond the frames together.

16. The method of claim 12, further including the step of applying pressure to the bonding surfaces during the step of placing the surfaces in contact.

17. The method of claim 17, wherein the pressure is applied with the assistance of gas pressure or a vacuum.

18. A method of manufacturing an optical component comprising: providing at least two optical articles each having a bonding surface; contacting the bonding surfaces of the optical articles with an acid; contacting the bonding surfaces of the optical articles with a solution having a pH greater than 8, whereby termination groups selected from the group consisting of —OH, ≡Si—OH, =Si—(OH)$_2$, —Si(OH)$_3$ and —O—Si—(OH)$_3$, and combinations thereof, are formed on the surfaces; and bonding the surface of the respective optical articles to each other without an adhesive and at a temperature below the softening temperature of the optical article.

19. The method of claim 18, wherein the optical article is selected from the group consisting of a lens, prism, polarizer, grating, filter, birefringent crystal and faraday rotator.

20. The method of claim 18, wherein the solution having a pH greater than 8 includes a hydroxide.

21. The method of claim 18, wherein the solution having a pH greater than 8 includes ammonium hydroxide.

22. The method of claim 18, further including the step of eliminating adsorbed water molecules at the interface between the bonding surfaces of the optical articles.

23. The method of claim 18, wherein a polymer is present in the optical articles, and the bonding step is performed at a temperature below the temperature at which the polymer degrades and applying pressure on the bonding surfaces.

* * * * *